United States Patent

(12) United States Patent
Bowsher et al.

(10) Patent No.: US 7,425,016 B2
(45) Date of Patent: Sep. 16, 2008

(54) HITCH COUPLER

(75) Inventors: Neil Edwin Bowsher, Sullivan, IL (US);
Ronald J. Hickenbottom, Sullivan, IL
(US); Greg Short, Matoon, IL (US);
Andrew Lay, Shelbyville, IL (US);
Steve Jankowski, Decatur, IL (US)

(73) Assignee: Agri-Fab, Inc., Sullivan, IL (US)

( * ) Notice: Subject to any disclaimer, the term of this patent is extended or adjusted under 35 U.S.C. 154(b) by 401 days.

(21) Appl. No.: 11/163,420

(22) Filed: Oct. 18, 2005

(65) Prior Publication Data

US 2007/0096429 A1    May 3, 2007

(51) Int. Cl.
*B60D 1/00* (2006.01)
(52) U.S. Cl. .................. 280/504; 280/511; 280/500; 280/515
(58) Field of Classification Search .......... 280/504, 280/506, 511, 500, 515
See application file for complete search history.

(56) References Cited

U.S. PATENT DOCUMENTS

| | | | |
|---|---|---|---|
| 2,984,502 A | 5/1961 | Tyrrell | |
| 3,782,761 A | 1/1974 | Cardin, Sr. | |
| 4,412,635 A | 11/1983 | Bateman | |
| 4,576,395 A | 3/1986 | Longoria | |
| 4,629,207 A | 12/1986 | Shiflet | |
| 5,433,467 A | 7/1995 | Easterwood | |
| D401,196 S | 11/1998 | Hartwig | |
| 5,897,126 A | 4/1999 | Morris | |
| 6,186,531 B1 | 2/2001 | Parent | |
| 6,247,257 B1 * | 6/2001 | Powell | 40/591 |
| 6,598,897 B1 | 7/2003 | Patti | |
| 6,846,126 B2 | 1/2005 | Parent | |
| 7,017,935 B1 * | 3/2006 | Bonfanti | 280/511 |

* cited by examiner

*Primary Examiner*—J. Allen Shriver
*Assistant Examiner*—Tashiana Adams
(74) *Attorney, Agent, or Firm*—Vedder Price P.C.

(57) ABSTRACT

A ball hitch coupler including first and second sidewalls spaced apart and generally parallel. First and second pins extend transversely between the first and second sidewalls spaced apart along a length of the first sidewall and the second sidewall. At least one of the first and second pins is removable and the first and second pins are disposed adjacent a neck portion of a ball to movably connect the ball hitch coupler to the ball between the first pin and the second pin.

18 Claims, 2 Drawing Sheets

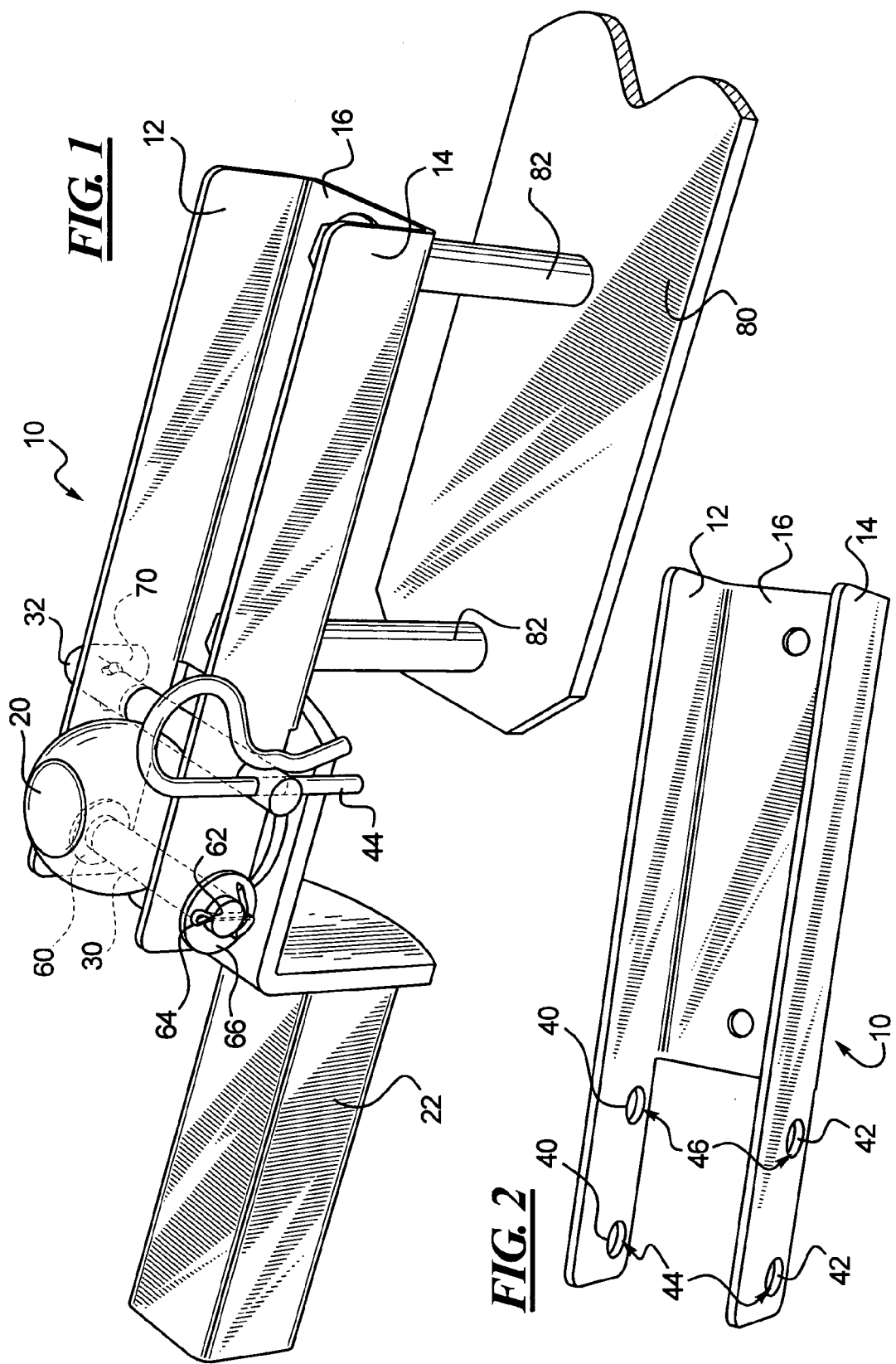

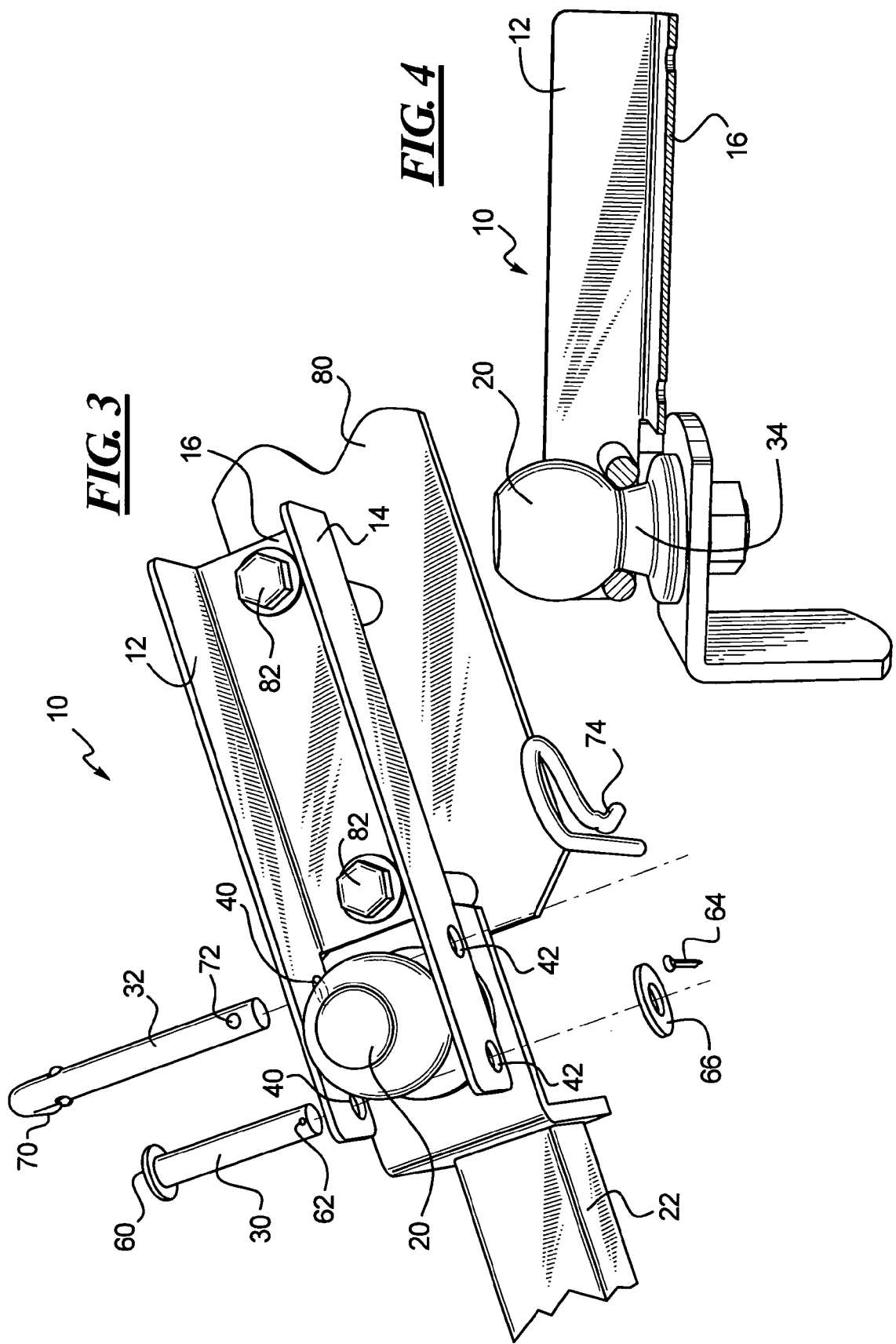

HITCH COUPLER

FIELD OF THE DISCLOSURE

The present disclosure generally relates to hitch assemblies, and more particularly, to a hitch coupler.

BACKGROUND

A conventional ball hitch coupler can be found on almost any bumper pull trailer, such as: boat trailer, snowmobile trailer, motorcycle trailer, camper, etc. The widely used conventional ball hitch coupler encompasses a large amount of surface area of the ball. The material and forming process required to form a conventional ball hitch coupler is very expensive and complex. Moreover, each ball hitch coupler can only fit one diameter ball. Accordingly, it is conceivable that a consumer may have two different trailers which each require a different size ball. Hence, a different tow bar or tongue for each different size ball would be required, again adding to the cost and expense to the customer.

Therefore, there exists a need in the art for an affordable ball hitch coupler that consumers can used to tow a vehicle that is equipped with a wide variety of hitch balls that is inexpensive, easy to use and cost effective to manufacture.

BRIEF DESCRIPTION OF THE DRAWINGS

Certain embodiments are shown in the drawings. However, it is understood that the present disclosure is not limited to the arrangements and instrumentality shown in the attached drawings, wherein:

FIG. 1 illustrates a perspective view of a hitch coupler constructed in accordance with the present disclosure shown as coupled to a hitch;

FIG. 2 illustrates a perspective view of the hitch coupler of FIG. 1;

FIG. 3 illustrates a perspective partial exploded view of the hitch coupler of FIG. 1; and FIG. 4 illustrates a fragmentary side perspective view of the hitch coupler of FIG. 1.

DETAILED DESCRIPTION

For the purposes of promoting and understanding the principles disclosed herein, reference will now be made to the preferred embodiments illustrated in the drawings and specific language will be used to describe the same. It will nevertheless be understood that no limitation of the scope is thereby intended. Such alterations and further modifications in the illustrated device and such further applications are the principles disclosed as illustrated therein as being contemplated as would normally occur to one skilled in the art to which this disclosure relates.

Referring to FIGS. 1-4, a hitch coupler 10 constructed in accordance with the teachings of the present disclosure is shown. The coupler 10 includes a first sidewall 12 and a second sidewall 14, which is spaced apart from the first sidewall 12 and is generally parallel with the first sidewall 12. A support member 16 connects and supports the two sidewalls 12 and 14 to form a "U" shaped bracket as shown in FIG. 2. The length of the support member 16 is less than the length of the sidewalls 12 and 14, and the support member is positioned from the mid to rear portion of the coupler 10. Accordingly, the front portion of the coupler 10 is unobstructed such that the space between the sidewalls is open to receive a ball 20 of a hitch 22. The coupler 10 includes a first pin 30 that extends transversely between the first sidewall 12 and the second sidewall 14. The coupler also includes a second pin 32 that extends transversely between the first sidewall 12 and the second sidewall 14 and is spaced apart from the first pin along the length of the first sidewall 12 and the second sidewall 14. It is within the teachings of this disclosure that use of the term "pin" shall not be limiting; rather, a pin may be any suitable element having a longitudinal extent greater than a distance between the outer surfaces of the sidewalls 12, 14 regardless of its structural configuration. As will be described in detail below, after the ball 20 of the hitch 22 is positioned in the space between the two sidewalls 12 and 14, the pins 30 and 32 are disposed adjacent a neck portion 34 of the ball 20 to movably connect the ball 20 to the coupler 10 and prevent disengagement of the ball 20 from the coupler 10.

The first sidewall 12 includes a pair of longitudinally spaced apart apertures 40 at a front portion thereof. Similarly, the second sidewall 14 includes a pair of longitudinally spaced apart apertures 42 at the front portion thereof. The apertures 40 of the first sidewall 12 and the apertures 42 of the second sidewall 14 are laterally aligned and correspond with each other so as to define a first pair of apertures 44 and a second pair of apertures 46. The desired distance between the first pair of apertures 44 and the second pair of apertures 46 is configured, such that when the pins 32 and 30 are inserted in the corresponding pair of apertures 44 and 46, the minimum distance between the pins is greater than the diameter of the neck portion 34 of the ball 20 and the maximum distance between the pins is less than a diameter of the ball 20. So configured, the coupler 10 will operatively engage different sized ball hitches. Accordingly, when the pins 30 and 32 are inserted through the first pair of apertures 44 and the second pair of apertures 46, the pins 32 and 30 are disposed adjacent the neck portion 34 of the ball 20 to movably connect and prevent the ball 20 from disengaging from the space between the first sidewall 12 and the second sidewall 14.

At least one of the pins 30 or 32 may be removable from the coupler 10. Accordingly, by one of the pins 30 or 32 being removable, the ball 20 can be inserted in the space between the first sidewall 12 and the second sidewall 14 for engagement of the ball 20 with the coupler 10. However in the disclosed examples, both the first pin 30 and the second pin 32 are removable from their corresponding pairs of apertures 44 and 46, respectively.

The first pin 30 includes a shaft that is sized to correspond with the internal diameter of the first pair of apertures 44 such that the first pin 30 can be inserted into the first pair of apertures 44 to extend between the first sidewall 12 and the second sidewall 14. To secure the first pin 30 between the first sidewall 12 and the second sidewall 14, the first pin 30 includes a head 60 at one end thereof and an aperture 62 at the opposite end thereof that is sized to receive a correspondingly sized cotter pin 64. The first pin 30 may also include a washer 66 so that when the first pin 30 moves in the first pair of apertures 44, the washer prevents excessive wear of the cotter pin 64. Accordingly, when the cotter pin 64 is engaged with the aperture 62 of the first pin 30, the first pin 30 is prevented from being removed from the first pair of apertures 44 along the direction of the head 60. Furthermore, because the head 60 has a larger diameter than the first pair of apertures 44, the first pin cannot be inserted into the first pair of apertures 44 beyond the head 60. Once the first pin 30 is inserted in the first pair of apertures 44 and secured as described above, the first pin 30 may not be removed, or may not have to be removed for the coupler 10 to engage to or be disengaged from the hitch 22.

The second pin 32 is sized to engage the second pair of apertures 46 so that it can be inserted in the second pair of apertures 46. To prevent over-insertion of the pin 32 into the second pair of apertures 46, the pin includes a handle 70 that will stop the pin from being inserted beyond the handle 70 into the second pair of apertures 46. Furthermore, the handle 70 will provide an operator of the coupler 10 with leverage to pull the second pin 32 out of the second pair of apertures 46 or insert the second pin 32 into the second pair of apertures 46. At the opposite end to the handle 70, the second pin 32 includes an aperture 72 that is sized to receive a cotter pin 74. Thus when the second pin 32 is fully inserted into the second pair of apertures 46, the cotter pin 74 can be inserted in the aperture 72 to secure the second pin 32 between the first sidewall 12 and the second sidewall 14.

The coupler 10 may be a stand-alone coupler 10 that can be attached to any tongue 80 of a trailer, cart, implement, towable apparatus or a vehicle. As shown in the FIGS. 1-4, the support member 16 may include a pair of mounting bolts 82 that can be inserted in a pair of correspondingly sized apertures 84 of the support member 16 and fastened to the tongue 80 through a pair of correspondingly aligned apertures in the tongue 80. Thus the coupler 10 can be attached to any type of tongue 80 of a trailer, cart or vehicle as an accessory or retrofit item. Alternatively, the tongue 80 of a trailer, cart or vehicle can be manufactured with an end portion that is configured similar to the coupler 10 to perform the functions of the coupler as described herein. Therefore, the coupler 10 can be used to modify existing tongues 80 of trailers, carts, vehicles or the like, or the coupler 10 as described herein can be integrally manufactured with the tongue 80 of trailers, carts, implement, towable apparatus, vehicles or the like.

The operation of the coupler 10 for engaging the tongue 80 with the hitch 22 will now be described. As described in the foregoing, both the first pin 30 and the second pin 32 may be removable such that the space between the first sidewall 12 and the second sidewall 14 is unobstructed. In such a scenario, an operator can position the coupler 10 over the ball 20 such that the ball 20 is disposed between the first sidewall 12 and the second sidewall 14. Particularly, the ball 20 can be positioned between the first sidewall 12 and the second sidewall 14 such that the neck portion 34 of the ball 20 is positioned between the first pair of apertures 44 and the second pair of apertures 46. The operator can then insert the first pin 30 into the first pair of apertures 44 and secure the first pin 30 with the cotter pin 64. Subsequently, the operator can insert the second pin 32 into the second pair of apertures 46 and secure the second pin 32 with the cotter pin 74 as described in the foregoing. The first pin 30 and the second pin 32 are disposed adjacent the neck portion 34 of the ball 20, as shown in FIG. 4, to provide some longitudinal movement of the ball 20 relative to the coupler 10. The first sidewall 12 and the second sidewall 14 provide some lateral movement of the ball 20 relative to the coupler 10. Hence, the ball 20 is free to rotate and move in any direction to a limited extent relative to the coupler 10 to allow the vehicle to which the hitch 22 is attached to move relative to the trailer, cart, implement, towable apparatus, vehicle or the like, to which the tongue 80 is attached.

As described previously, the first pin 30 may be already secured in the first pair of apertures 44 of the coupler 10 prior to an operator attaching the coupler 10 to the hitch 22. In such a scenario, the operator can lift the coupler until the ball 20 can be inserted in the space between the first sidewall 12, the second sidewall 14 and the first pin 30. Subsequently, the operator can insert the second pin 32 into the second pair of apertures 46 and secure the second pin 32 with the cotter pin 74 to secure the second pin 32 to the sidewalls 12 and 14. Accordingly, the ball 20 can be movably connected between the first and second sidewalls 12 and 14. Furthermore, the neck portion 34 of the ball 20 is also operatively retained by the first pin 30 and the second pin 32, as shown in FIG. 4, thus enabling the ball 20 to move to provide rotation and pitch of the hitch 22 relative to the tongue 80.

As described in the foregoing, at least one of the pins, the first pin 30 or the second pin 32 may be removable to allow an operator to place the coupler 10 over the ball such that the ball 20 is inserted in the space between the first sidewall 12 and the second sidewall 14. Because only one of the pins 30 or 32 has to be removable, any one of the pins 30 or 32 may be fixed to the first sidewall 12 or the second sidewall 14. For example, the first pin 30 may be manufactured with the sidewalls so that it is an integral part of the coupler 10, or the first pin 30 can be fixed to the sidewall 12 or the sidewall 14 by methods that are known to those of ordinary skill in the art such as welding.

Furthermore, while the particular preferred embodiments have been shown and described, it will be obvious to those skilled in the art that changes and modifications may be made without departing from the teaching of the disclosure. The matter set forth in the foregoing description and accompanying drawings is offered by way of illustration only and not as limitation. The actual scope of the disclosure is intended to be defined in the following claims when viewed in their proper perspective based on the related art.

What is claimed is:

1. A ball hitch coupler comprising: a first sidewall; a second sidewall spaced apart from the first sidewall and generally parallel with the first side wall; a support member attached to the first sidewall at a mid portion of the first side wall extending to a rear portion of the first side wall and also attached to the second sidewall at a mid portion of the second side wall extending to a rear portion of the second side wall, thereby adapted to support the first sidewall and the second sidewall at rear portions of the first and second sidewall and leaving the front portion of the ball hitch coupler unobstructed such that the space between the front of the first sidewall and the front of the second sidewall is open; a first pin extending transversely between the first side wall and the second sidewall; a second pin extending transversely between the first side wall and the second sidewall and spaced apart from the first pin along a length of the first sidewall and the second sidewall; wherein at least one of the first pin and the second pin is removable; and wherein the first pin and the second pin are disposed adjacent a neck portion of a ball to movably connect the ball between the first pin and the second pin.

2. The ball hitch coupler of claim 1, wherein the support member is adapted to be attached to a tongue of a any one of a cart and a trailer.

3. The ball hitch coupler of claim 1, wherein the first pin includes at least one aperture at one end thereof adapted to receive a cotter pin to secure the pin to the first side wall and the second side wall.

4. The ball hitch coupler of claim 1, wherein the second pin includes a handle at one end thereof and an aperture at the other end thereof, the aperture adapted to receive a cotter pin to cooperatively with the handle secure the second pin to the first sidewall and the second sidewall.

5. The ball hitch coupler of claim 1, wherein a space between the sidewalls is adapted to receive different sized balls.

6. The ball hitch coupler of claim 1, wherein the first and second pins are spaced to receive different sized balls.

7. A ball hitch coupler comprising: a first sidewall having a pair of longitudinally spaced apart apertures at a front portion thereof; a second sidewall having a pair of longitudinally spaced apart apertures at a front portion thereof, wherein the second sidewall is laterally spaced apart from the first sidewall, and wherein the apertures of the second side wall are laterally aligned with corresponding apertures of the first side wall to define a first pair and second pair of laterally aligned apertures; a support member attached to the first sidewall at a mid portion of the first side wall extending to a rear portion of the first side wall and also attached to the second sidewall at a mid portion of the second side wall extending to a rear portion of the second side wall, thereby adapted to support the first sidewall and the second sidewall at rear portions of the first and second sidewall and leaving the front portion of the ball hitch coupler unobstructed such that the space between the front of the first sidewall and the front of the second sidewall is open; a first pin adapted to extend between and engage the first pair of laterally aligned apertures; a second pin adapted to extend between and engage the second pair of laterally aligned apertures; wherein at least one of the first pin and the second pin is removable; and wherein the first pin and the second pin are disposed adjacent a neck portion of a ball to movably connect the ball between the first pin and the second pin.

8. The ball hitch coupler of claim 7, wherein the support member is adapted to be attached to a tongue of a any one of a cart and a trailer.

9. The ball hitch coupler of claim 7, wherein the first pin includes at least one aperture at one end thereof adapted to receive a cotter pin to secure the pin to the first side wall and the second side wall.

10. The ball hitch coupler of claim 7, wherein the second pin includes a handle at one end thereof and a aperture at the other end thereof, the aperture adapted to receive a cotter pin to cooperatively with the handle secure the second pin to the first sidewall and the second sidewall.

11. The ball hitch coupler of claim 7, wherein a space between the sidewalls is adapted to receive different sized balls.

12. The ball hitch coupler of claim 7, wherein the first and second pins are spaced to receive different sized balls.

13. A any one of a cart, implement and trailer for coupling to a ball of a vehicle, the any one of a cart, implement and trailer comprising: a frame ball hitch coupler disposed at a forward end thereof, the ball hitch coupler comprising: a first sidewall; a second sidewall spaced apart from the first sidewall and generally parallel with the first side wall; a support member attached to the first sidewall at a mid portion of the first side wall extending to a rear portion of the first side wall and also attached to the second sidewall at a mid portion of the second side wall extending to a rear portion of the second side wall, thereby adapted to support the first sidewall and the second sidewall at rear portions of the first and second sidewall and leaving the front portion of the ball hitch coupler unobstructed such that the space between the front of the first sidewall and the front of the second sidewall is open; a first pin extending transversely between the first side wall and the second sidewall; a second pin extending transversely between the first side wall and the second sidewall and spaced apart from the first pin along a length of the first sidewall and the second sidewall; wherein at least one of the first pin and the second pin is removable; and wherein the first pin and the second pin are disposed adjacent to a neck portion of the ball to maintain the any one of a cart, implement and trailer movably connected to the vehicle.

14. The any one of a cart and a trailer of claim 13, wherein the support member is adapted to be attached to a tongue of a any one of a cart and a trailer.

15. The any one of a cart and a trailer of claim 13, wherein the first pin includes at least one aperture at one end thereof adapted to receive a cotter pin to secure the pin to the first side wall and the second side wall.

16. The any one of a cart and a trailer of claim 13, wherein the second pin includes a handle at one end thereof and a aperture at the other end thereof, the aperture adapted to receive a cotter pin to cooperatively with the handle secure the second pin to the first sidewall and the second sidewall.

17. The any one of a cart and a trailer of claim 13, wherein a space between the sidewalls is adapted to receive different sized balls.

18. The ball hitch coupler of claim 13, wherein the first and second pins are spaced to receive different sized balls.

* * * * *